Sept. 29, 1959     A. A. WAGNER ET AL     2,906,359

RADIATOR-PROTECTING GRILL ATTACHMENT FOR A TRACTOR

Original Filed March 10, 1950

Inventors
ADOLPH A. WAGNER
ARNOLD J. WERNER

Wheeler, Wheeler & Wheeler
Attorneys

United States Patent Office 2,906,359
Patented Sept. 29, 1959

2,906,359

RADIATOR-PROTECTING GRILL ATTACHMENT FOR A TRACTOR

Adolph A. Wagner, Milwaukee County, and Arnold J. Werner, Waukesha County, Wis., assignors to Wagner Iron Works, Milwaukee, Wis., a corporation of Wisconsin Original application March 10, 1950, Serial No. 148,961, now Patent No. 2,672,994, dated March 23, 1954. Divided and this application February 18, 1954, Serial No. 411,074

4 Claims. (Cl. 180—68)

This invention relates to a combined base frame and front grill for a tractor attachment.

The object of the invention is to provide a front grill for a tractor which may be made integral with the base frame of a tractor attachment of the type disclosed in our co-pending application Serial No. 148,961 filed March 10, 1950, and entitled "Hydraulic Implement Control Unit," now Patent 2,672,994 issued March 23, 1954, and of which this is a division. In this connection, it is an object of the invention to provide a sturdy and protective grill work at the front end of the tractor to protect the tractor radiator, hood, and hydraulic fluid pump. The grill further provides an anchorage to which a hydraulic motor may be attached for certain power applications and moreover provides a mounting for a hydraulic pump. The reenforced front portion of the base frame is also useful as a bumper or pusher when the upwardly swingable boom is removed or elevated.

Other objects and advantages of the invention will be more apparent upon examination of the following disclosure in which.

Figure 1:
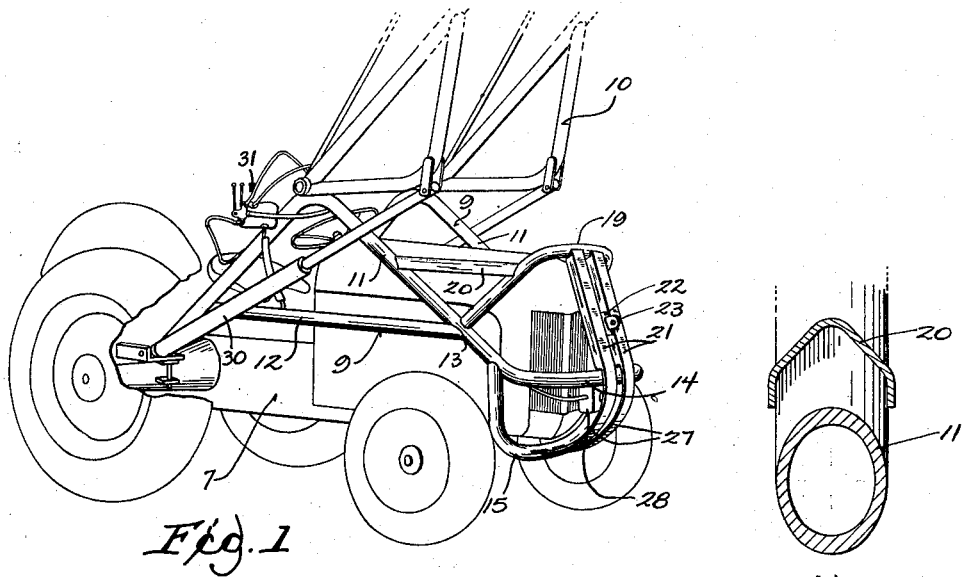
Fig. 1 is a perspective view of the tractor equipped with a combined base frame and front end grill embodying the invention.
Figure 3:
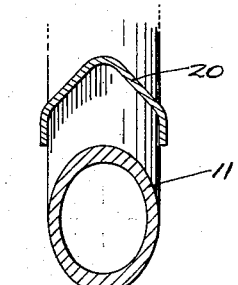
Fig. 3 is a cross sectional view taken along the line 3—3 of Fig. 2.
Figure 2:
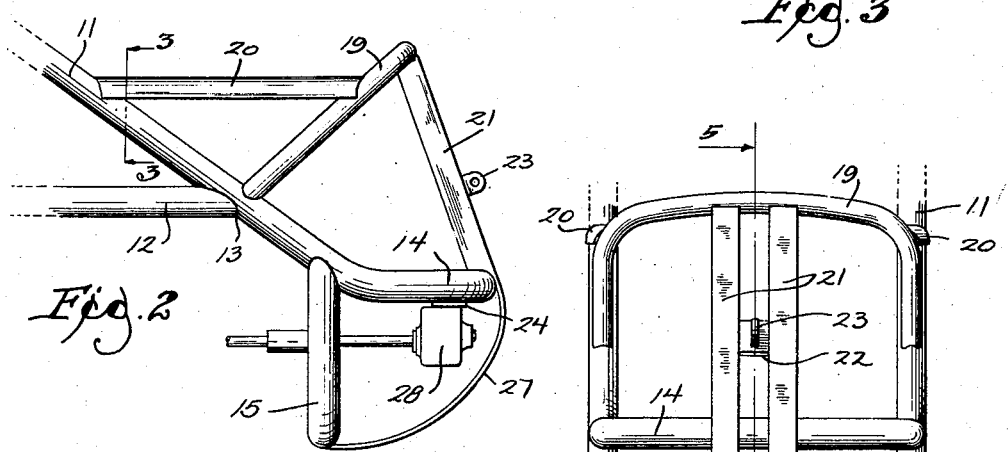
Fig. 2 is a fragmentary side elevational view on an enlarged scale of the front portion of the device of Fig. 1.
Figure 4:
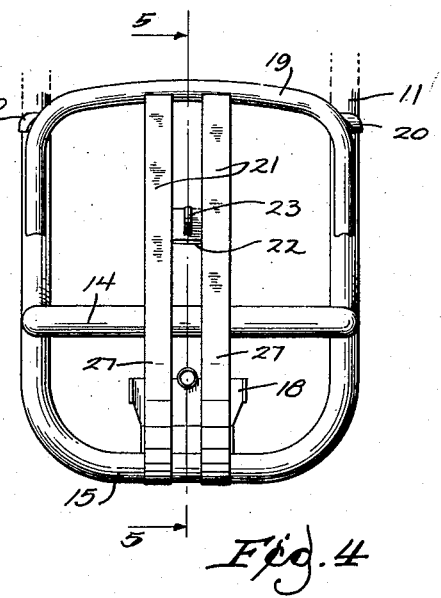
Fig. 4 is a front elevation of the grillwork, on the same scale as Fig. 2.
Figure 5:
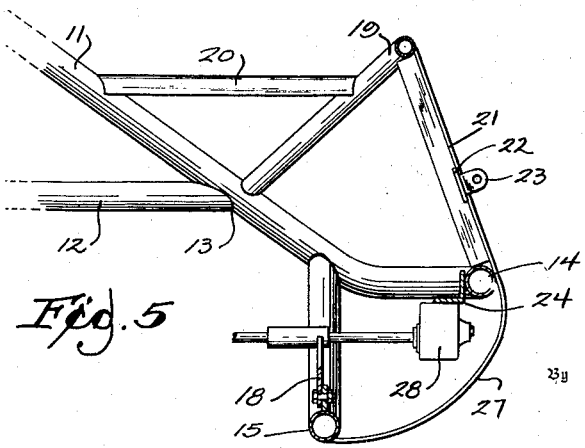
Fig. 5 is a cross sectional view taken along the lines 5—5 of Fig. 4

The tractor, illustrated in outline as 7, is provided with a base frame which comprises spaced A-frames 9 which are disposed at opposite sides of the tractor and are rigidly connected with the tractor for the pivotal support of a boom indicated generally as 10 (Fig. 1). The boom is more fully described in our co-pending application aforesaid, and as it comprises no part of the claimed subject matter herein, will not be further described.

The respective A-frames 9 comprise arched members 11 and cross members 12 joined as by welding with the arched members 11 at 13. The frontal portions of the respective arched members 11 are mutually inwardly curved to comprise an integral U-shaped tubular part 14 embracing the front portion of the tractor radiator. Depending from its welded connection to the arched members 11 is an underslung tubular U-shaped member 15 which fits beneath the radiator and receives support from the front of the tractor through bracket 18 which rigidly mounts the frame to the front part of the tractor.

The grill further comprises an additional U-shaped tubular member 19 welded to arched members 11 adjacent their junctions 13 with cross members 12. Member 19 bows upwardly and forwardly over the top of the tractor radiator. Member 19 is braced in this position by the channel-shaped braces 20 which are disposed in the plane of the respective A-frame 9, and connect member 19 to the arched elements 11 of the A-frames. The channel members 20 are substantially parallel to the cross members 12 of the A-frame.

The top, intermediate and bottom U-shaped members 19, 14 and 15, respectively, provide spaced supports for, and are themselves braced by the laterally spaced rectilinear angle pieces 21 which extend between U-shaped members 19 and 14, and are extended in curved strap form at 27 from U-shaped member 14 to U-shaped member 15. As shown, the angle members 21 are rectilinear and may be bridged by a bracket 22 which has a forwardly projecting apertured ear or coupling 23 to which a hydraulic motor or the like may be swingably attached.

The construction disclosed is very rigid and fully protects the radiator of the tractor from injury and also provides a very sturdy mount at coupling 23 upon which various apparatus may be connected as more fully described in the aforenoted co-pending application. The U-shaped members 14, 15, 19 have leg portions which laterally embrace the radiator and transverse portions crossing over the front, bottom and top of the radiator. The straps 21, 27 connect with the transverse portions of the U-shaped members intermediate their leg portions. The hydraulic pump 28 for pressurizing fluid which powers the boom jacks 30 under control of valve 31 may be suspended from U-shaped member 14 by angle bracket 24 and is protected by the curved straps 27 which enclose it.

We claim:

1. An attachment for a tractor having a radiator, said attachment comprising side frame members, and a radiator-protecting grill, said grill including mutually divergent top, intermediate and lower U-shaped members respectively having legs connected with the side frame members and vertically spaced transverse portions connecting the legs and strap means connected with the transverse portions of the several U-shaped members intermediate the legs thereof, said transverse portions being spaced longitudinally along said strap means.

2. The device of claim 1 in which said grill further comprises brace members respectively extending from side frame members to leg portions of the top U-shaped member.

3. The device of claim 1 in which said strap means is substantially retilinear between the transverse portions of the top and intermediate U-shaped member and is curved between the transverse portions of the intermediate member and the bottom member.

4. The device of claim 3 in which the rectilinear portion of said strap means is provided with a coupling intermediate the transverse portions of the top and intermediate U-shaped members.

References Cited in the file of this patent

UNITED STATES PATENTS

| | | |
|---|---|---|
| 2,399,810 | Ketcham | May 7, 1946 |
| 2,479,048 | Machin | Aug. 16, 1949 |
| 2,489,629 | Ford | Nov. 29, 1949 |
| 2,492,410 | Arps | Dec. 27, 1949 |
| 2,495,144 | Simmonds | Jan. 17, 1950 |